United States Patent
Schmidl et al.

(10) Patent No.: US 6,404,826 B1
(45) Date of Patent: Jun. 11, 2002

(54) ITERATIVE SIGNAL-TO-INTERFERENCE RATIO ESTIMATION FOR WCDMA

(75) Inventors: Timothy M. Schmidl, Dallas; Anand G. Dabak, Richardson; Srinath Hosur, Dallas, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/218,939

(22) Filed: Dec. 22, 1998

Related U.S. Application Data

(60) Provisional application No. 60/091,488, filed on Jul. 2, 1998.

(51) Int. Cl.[7] .......................... H04L 27/06; H04B 17/00
(52) U.S. Cl. .................. 375/340; 375/224; 375/227; 375/316; 375/147; 370/342; 455/226.2; 455/522
(58) Field of Search .................. 375/224, 227, 375/147, 148, 316, 340, 341, 346, 347, 349; 370/342, 335, 441; 455/673, 69, 226.2, 226.3, 522

(56) References Cited

U.S. PATENT DOCUMENTS

| | | | | |
|---|---|---|---|---|
| 5,204,878 A | * | 4/1993 | Larsson | 375/232 |
| 5,228,054 A | | 7/1993 | Rueth et al. | 375/1 |
| 5,692,015 A | * | 11/1997 | Higashi et al. | 375/340 |
| 6,070,086 A | * | 5/2000 | Dobrica | 455/522 |
| 6,144,860 A | * | 11/2000 | Komatsu | 455/522 |
| 6,215,827 B1 | * | 4/2001 | Balachandran et al. | 375/262 |
| 6,292,519 B1 | * | 9/2001 | Popovic | 375/346 |
| 6,341,224 B1 | * | 1/2002 | Dohi et al. | 455/522 |

OTHER PUBLICATIONS

"Report On FPLMTS Radio Transmission Technology Special Group", (Round 2 Activity Report), Association of Radio Industries and Business (ARIB), FPLMTS Study Committee, Draft Version E1.1, Jan. 10, 1997, 224 pages.

"Proposed Wideband CDMA (W–CDMA)", Association of Radio Industries and Businesses (ARIB), Japan, 01/97, 213 pages.

* cited by examiner

Primary Examiner—Stephen Chin
Assistant Examiner—Betsy L. Deppe
(74) Attorney, Agent, or Firm—Robert N. Rountree; Wade James Brady III; Frederick J. Telecky, Jr.

(57) ABSTRACT

A circuit is designed with an estimate circuit (132) coupled to receive a plurality of predetermined signals (416–418) from an external source. Each of the predetermined signals is spaced apart in time. The estimate cit produces a first estimate signal in response to at least one of the plurality of predetermined signals. An averaging circuit is coupled to receive a data signal 420 and at least one of the plurality of predetermined signals. The averaging circuit produces an average signal from the data signal and at least one of the plurality of predetermined signals.

29 Claims, 4 Drawing Sheets

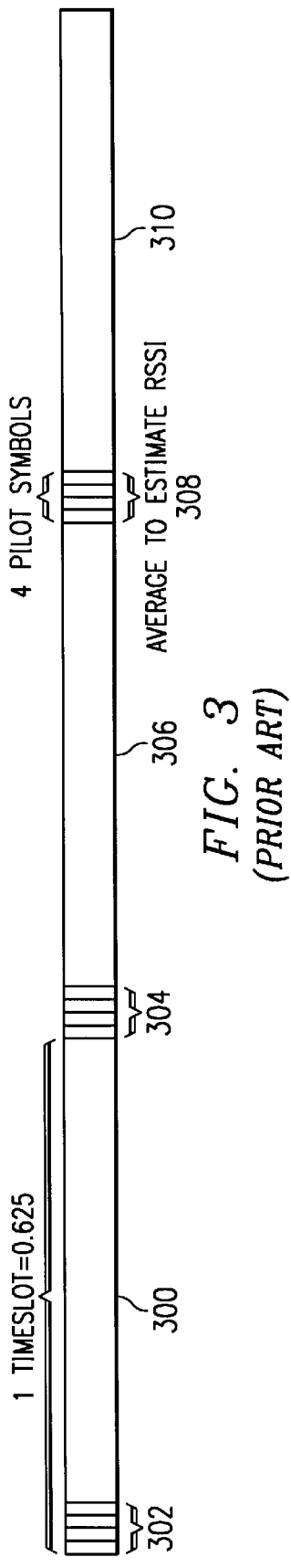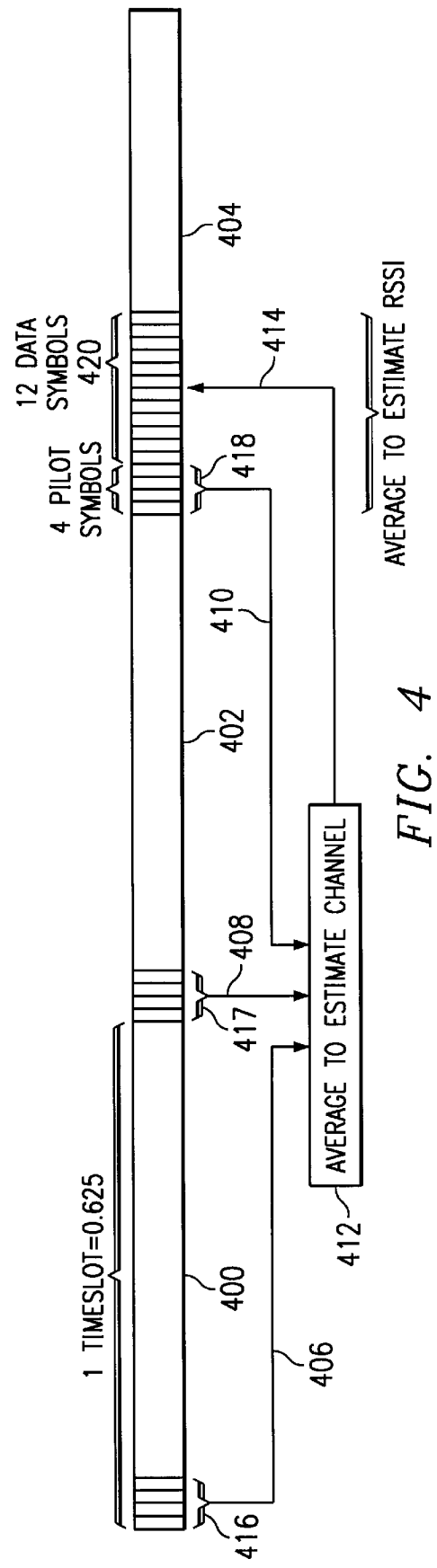

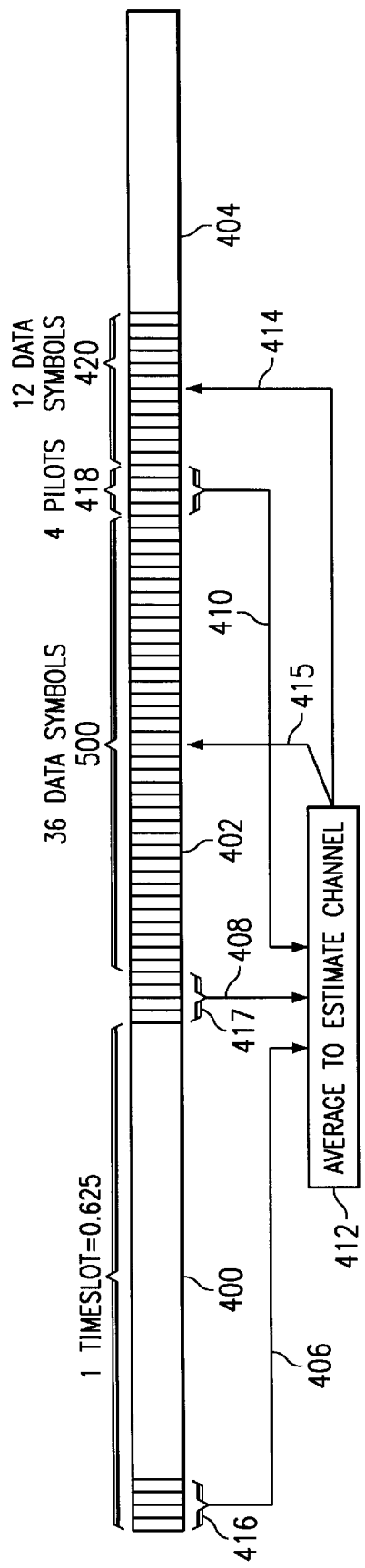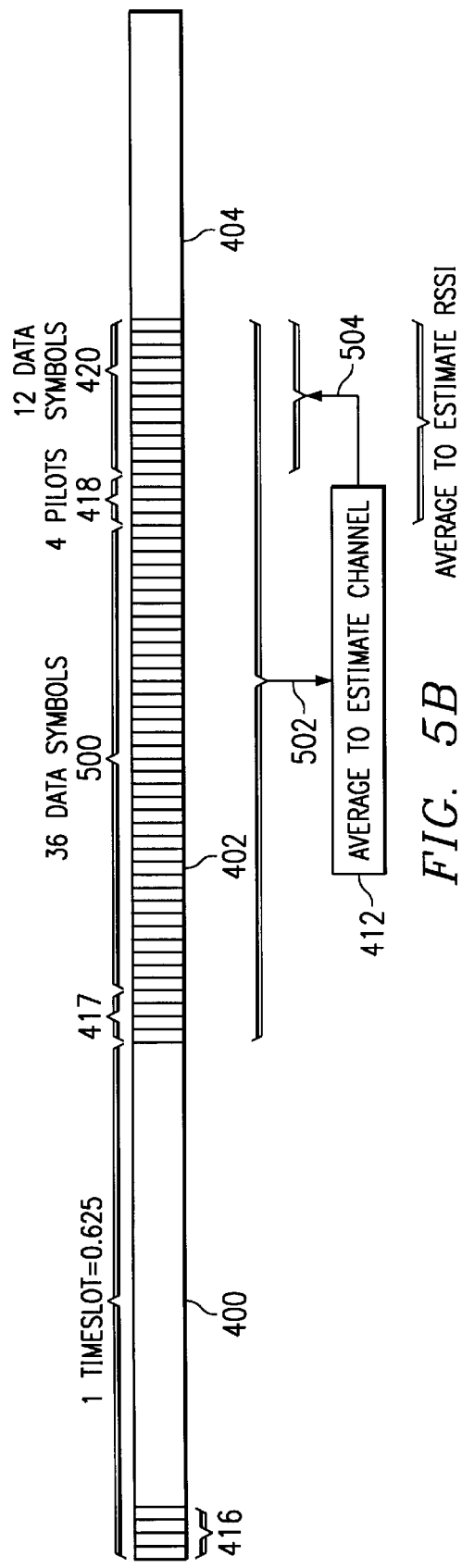

ITERATIVE SIGNAL-TO-INTERFERENCE RATIO ESTIMATION FOR WCDMA

CLAIM TO PRIORITY OF PROVISIONAL APPLICATION

This application claims priority under 35 U.S.C. §119(e)(1) of provisional application Ser. No. 60/091,488, filed Jul. 2, 1998.

FIELD OF THE INVENTION

This invention relates to wideband code division multiple access (WCDMA) for a communication system and more particularly to signal-to-interference ratio estimation of WCDMA signals.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in Provisional U.S. Patent Application No. 60/082,671, filed Apr. 22, 1998, and incorporated herein by reference. These WCDMA systems are coherent communications systems with pilot symbol assisted channel estimation schemes. These pilot symbols are transmitted as quadrature phase shift keyed (QPSK) known data in predetermined time frames to any receivers within range. The frames may propagate in a discontinuous transmission (DTX) mode. For voice traffic, transmission of user data occurs when the user speaks, but no data symbol transmission occurs when the user is silent. Similarly for packet data, the user data may be transmitted only when packets are ready to be sent. The frames are subdivided into sixteen equal time slots of 0.625 milliseconds each. Each time slot is further subdivided into equal symbol times. At a data rate of 32 thousand symbols per second (ksps), for example, each time slot includes twenty symbol times. Each frame includes pilot symbols as well as other control symbols such as transmit power control (TPC) symbols and rate information (RI) symbols. These control symbols include multiple bits otherwise known as chips to distinguish them from data bits. The chip transmission time ($T_c$), therefore, is equal to the symbol time rate (T) divided by the number of chips in the symbol (N).

Referring to FIG. 1, there is a simplified diagram of a mobile communication system. The mobile communication system includes an antenna 100 for transmitting and receiving external signals. The diplexer 102 controls the transmit and receive function of the antenna. Multiple fingers of rake combiner circuit 104 combine received signals from multiple paths. Symbols from the rake combiner circuit 104 are applied to a bit error rate (BER) circuit 110 and to a Viterbi decoder 106. Decoded symbols from the Viterbi decoder are applied to a frame error rate (FER) circuit 108. Averaging circuit 112 produces one of a FER and BER. This selected error rate is compared to a corresponding target error rate from reference circuit 114 by comparator circuit 116. Detector circuit 118 produces an output signal corresponding to the comparison. This output signal and a feedback signal from delay circuit 120 are added by circuit 122 to produce a signal-to-interference ratio (SIR) reference signal on lead 124.

Pilot symbols from the rake combiner 104 are applied to the SIR measurement circuit 132. The SIR measurement circuit produces a received signal strength indicator (RSSI) estimate from an average of received pilot symbols. The SIR measurement circuit also produces an interference signal strength indicator (ISSI) estimate from an average of interference signals from base stations and other mobile systems over many time slots. The SIR measurement circuit produces an SIR estimate from a ratio of the RSSI signal to We ISSI signal. This SIR estimate is compared with a target SIR by circuit 126. Detector circuit 128 produces an output signal corresponding to the comparison that is applied to TPC command circuit 130. The TPC command circuit 130 sets a TPC symbol that is transmitted to a remote base station. This TPC symbol instructs the base station to either increase or decrease transmit power by preferably 1 dB for subsequent transmission.

The diagram of FIG. 2 illustrates the closed-loop transmit power control sequence between of the base station and the mobile system. The base station receives a group of pilot symbols 200 in a time slot 204 from the mobile system. The base station determines an SIR ratio from the pilot symbols 200 and TPC symbol 202 and adjusts transmit power accordingly. This adjusted transmit power is applied to time slot 210 of downlink 220. The time slot 210 is offset from time slot 204 by one-halftime slot or 0.3125 milliseconds, so the mobile system has time to adjust transmit power in response to TPC symbol 208 for the next time slot 218 of uplink 230. The mobile system determines an RSSI estimate from pilot symbols 206 of time slot 210. For high data-rate channels such as 256–1024 thousand symbols per second (ksps), there are preferably eight pilot symbols in each time slot. For low data-rate channels such as 32–128 ksps (FIG. 3) there are preferably four pilot symbols in each time slot. The ISSI estimate includes an average of interference signals over many time slots. The ISSI estimate, therefore, is relatively stable and changes slowly with time. By way of comparison, an RSSI estimate for time slot 310 may include of an average of pilot symbols 308 alone. This small sample produces large variations in the RSSI estimate. For example, for six fingers of rake combiner circuit 104, the RSSI estimate $\hat{S}_m$ for the $m^{rm}$ time slot is given by equation [1]. Here, $r_{k,m,g}$ corresponds to the $k^{th}$ pilot symbol of the $m^{th}$ time slot and the $g^{th}$ finger with the pilot symbol data removed.

$$\hat{S}_m = \frac{1}{16}\sum_{g=1}^{6}\left(\left|\sum_{k=1}^{4} r_{k,m,g}\right|^2\right) \qquad [1]$$

This RSSI estimate may fluctuate abruptly due to the limited number of pilot symbols available for averaging. The SIR estimate is given by equation [2], where $\hat{1}_m$ is the ISSI estimate for the $m^{th}$ time slot, which is obtained by averaging the interference from many previous time slots. Since the SIR estimate is a ratio of the RSSI to the ISSI estimate, most of the variation of the SIR estimate is due to the RSSI variation. The variation in the SIR estimate produces erratic TPC control and correspondingly large variations in transmit power.

$$S\hat{I}R_m = \frac{\hat{S}_m}{\hat{I}_m} \quad [2]$$

These large variations in transmit power degrade communications between the base station and the mobile system.

SUMMARY OF THE INVENTION

These problems are resolved by a circuit comprising an estimate circuit coupled to receive a plurality of predetermined signals from an external source. Each of the predetermined signals is spaced apart in time. The estimate circuit produces a first estimate signal in response to at least one of the plurality of predetermined signals. An averaging circuit is coupled to receive a data signal and the at least one of the plurality of predetermined signals. The averaging circuit produces an average signal from the data signal and the at least one of the plurality of predetermined signals.

The present invention improves signal-to-interference estimation by averaging pilot symbols and corrected data symbols. Closed-loop power control is improved. A standard deviation of transmit power is greatly reduced, and the link margin of the system is improved.

BRIEF DESCRIPTION OF THE DRAWINGS

A more complete understanding of the invention may be gained by reading the subsequent detailed description with reference to the drawings wherein:

FIG. 3 is a diagram showing pilot symbols used for received signal strength estimation of the prior art;

FIG. 4 is a diagram showing pilot symbols used for received signal strength estimation of the present invention;

FIG. 5A is a diagram showing a first it on of signal-to-interference ratio determination of the present invention;

FIG. 5B is a diagram showing a second iteration of signal-to-interference ratio determination of the present invention;

DETAILED DESCRIPTION OF THE PREFERRED EMBODIMENTS

Figure 1:
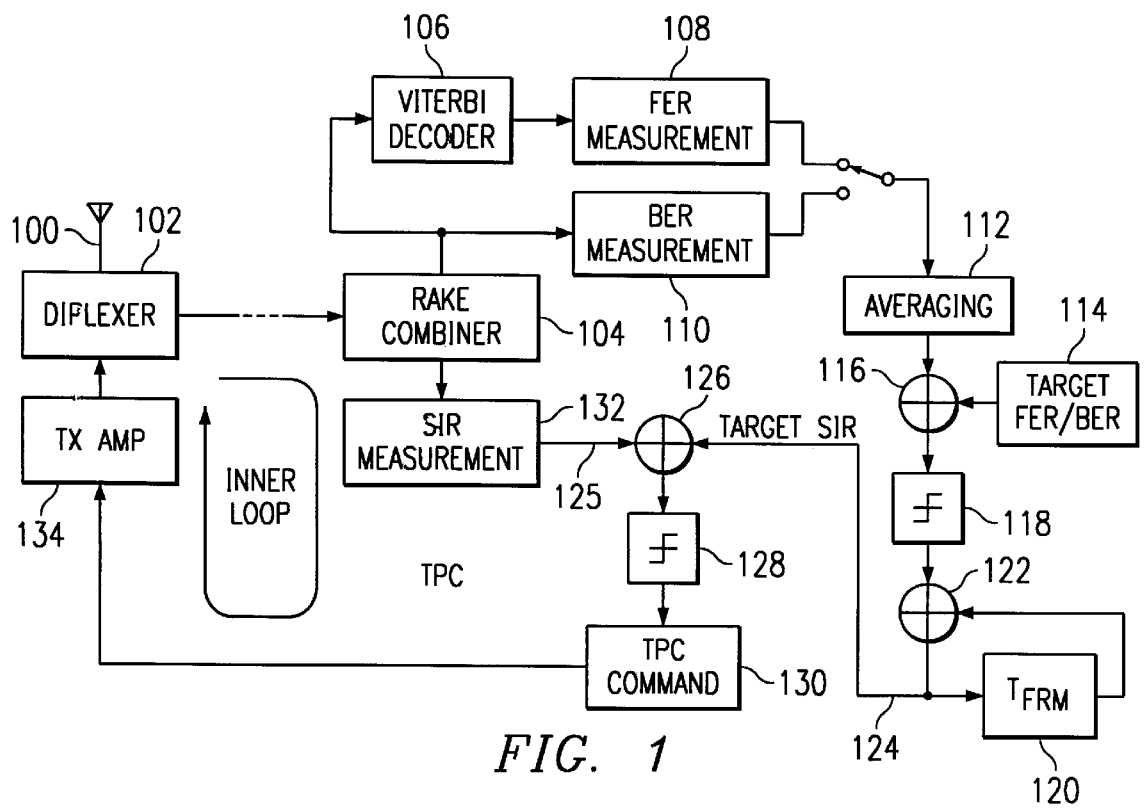
FIG. 1 is a block diagram of a mobile communications system.
Figure 2:
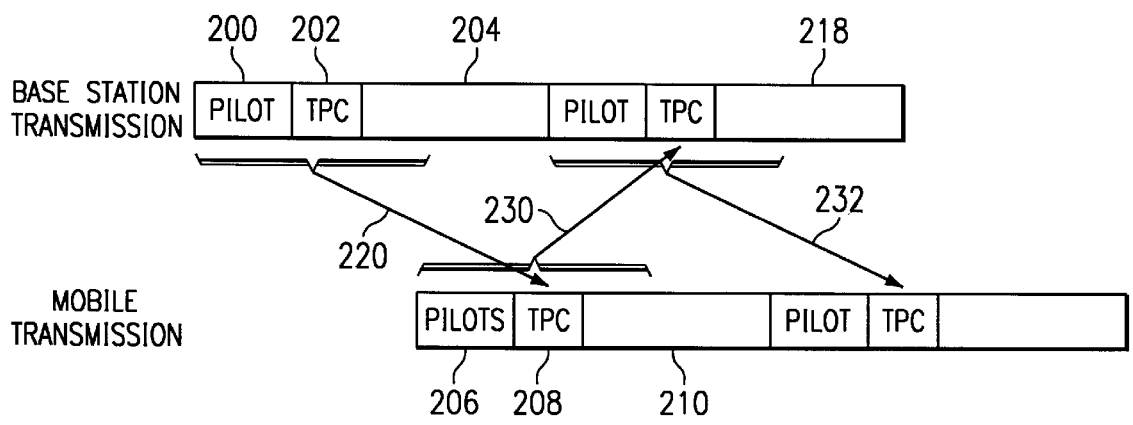
FIG. 2 is a diagram showing a transmit power control sequence of the prior art.

Referring to FIG. 4, there is a diagram showing pilot symbols used for received signal strength indicator (RSSI) estimation of the present invention. The SIR measurement circuit 132 (FIG. 1) is designed to sample groups of pilot symbols (416–418) from three consecutive time slots (400–404) having an exemplary data rate of 64 ksps with forty symbols in each time slot. These pilot symbols are predetermined signals having a known value. Averaging circuit 412 produces an average of these predetermined symbols to produce an improved channel estimate of phase and magnitude of received data signals. This improved channel estimate is then used by a correction or demodulation circuit to correct the first twelve data symbols 420 of the current time slot 404. The logical state of these twelve corrected data symbols is then known and they are used as virtual pilot symbols. An estimate circuit included in SIR measurement circuit 132 then averages pilot symbols 418 together with virtual pilot symbols or corrected data symbols 420 of the current frame 404 and produces an RSSI estimate signal according to equation [3].

$$\hat{S}_m = \frac{1}{256} \sum_{g=1}^{6} \left( \left| \sum_{k=1}^{16} r_{k,m,g} \right|^2 \right) \quad [3]$$

This new RSSI estimate of equation [3] is highly advantageous in comparison to the estimate of equation [1] of the prior art. An average of pilot symbols in the current time slot together with pilot symbols from the two previous time slots determines the improved channel estimate. The improved channel estimate is used to create virtual pilot symbols 420 from data symbols in the current time slot. The RSSI estimate, therefore, is an average of the sixteen most recent symbols of the current time slot, including four pilot symbols 418 and twelve virtual pilot symbols 420. By way of comparison with equation [1] of the prior art, the RSSI estimate of equation [3] with six rake fingers is an average of sixteen. This increase in symbols by a factor of four produces a more stable RSSI estimate with a smaller variance over time. Thus, closed-loop transmit power is more closely regulated between the base station and the mobile communication system.

The SIR measurement circuit 132 produces an SIR signal on lead 125 (FIG. 1) in response to the new RSSI and the ISSI. A comparison circuit 126 compares the SIR signal to a target SIR on lead 124. A result of the comparison is applied to TPC command circuit 130 via circuit 128. The TPC command circuit then applies an appropriate TPC symbol to transmit amplifier 134 for inclusion in the next transmit time slot. This TPC symbol instructs a remote base station to preferably increase or decrease transmit power by 1 dB.

Tuning now to FIG. 5A, there is a diagram of a first iteration of an iterative signal-to-interference ratio determination of the present invention. Average circuit 412 receives tree groups of four pilot symbols 416–418 from the current time slot 404 and the prior time slots (400–402). The averaging circuit produces an improved initial channel estimate of Rayleigh fading from the predetermined state of these twelve pilot symbol& The correction or demodulation circuit then uses this improved channel estimate to correct phase and magnitude of thirty-six data symbols 500 from time slot 402 as well as twelve data symbols from time slot 404. These corrected data symbols yield forty-eight virtual pilot symbols 500 and 420. In a second iteration of the iterative signal-to-interference ratio determination (FIG. 58), averaging circuit 412 produces a second channel estimate of Rayleigh fading from pilot symbols 417–418 and virtual pilot symbols 500 and 420. The correction circuit then uses the second channel estimate to correct data symbols 420 of frame 404. An iterative RSSI is determined from an average of pilot symbols 418 and corrected data symbols 420. This iterative RSSI provides a further improvement of the channel estimate used to correct data symbols of the current time slot 404. This improved channel estimate further improves the RSSI and subsequent SIR estimate. The SIR estimate, therefore, provides more stable closed-loop transmit power control between the remote base station and the mobile communication system.

Figure 6A:
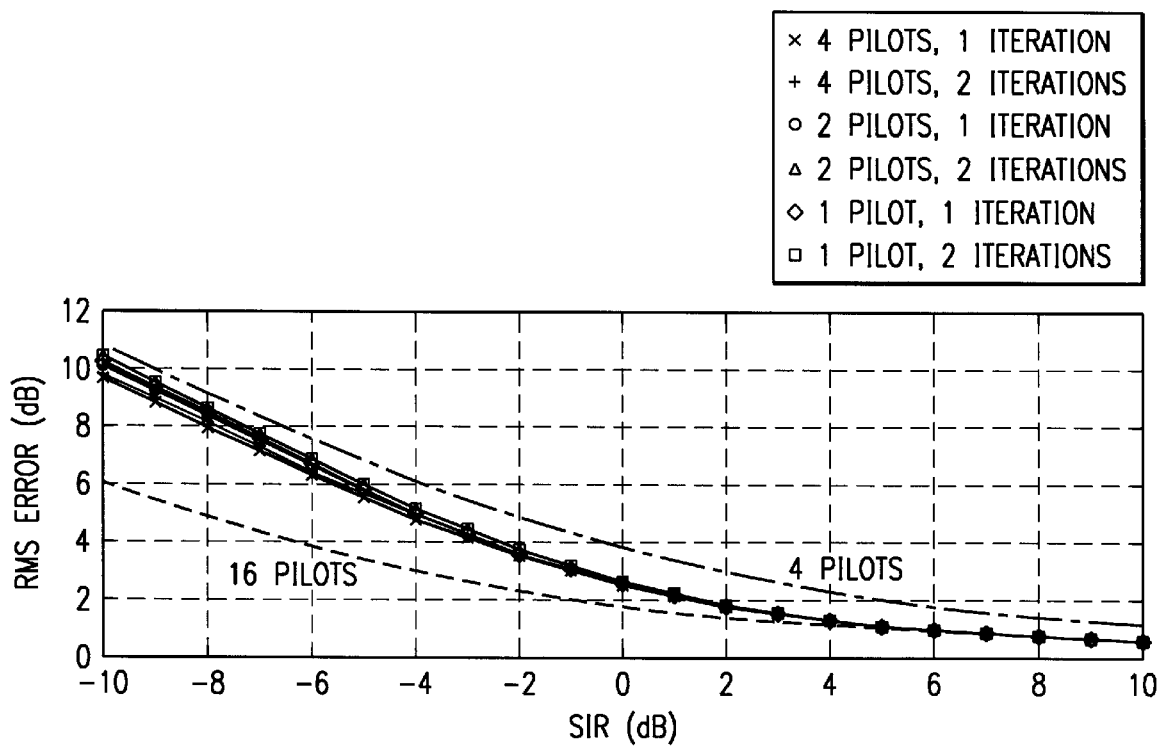
FIG. 6A is a simulation result of RMS error for the RSSI estimate of the present invention.

Referring now to FIG. 6A, there is a simulation result of root-mean-square (RMS) error for the RSSI estimate of the present invention. The RSSI estimate corresponds to a Rayleigh channel with four paths and an 80 Hz Doppler rate. The family of curves includes an upper dashed curve corresponding to RSSI estimation of the prior art for four pilot symbols. A lower dashed curve for sixteen pilot symbols is included as a theoretical minimum error for comparison with simulations of the present invention. The RSSI estimates of the present invention include intermediate curves for one, two and four pilot symbols and for one and two iterations. The RSSI estimate of the present invention produces a smaller RMS error than four pilot symbol of the prior art over the entire SIR range. Furthermore, iterative RSSI estimates for one and two pilot symbols have only a slightly greater RMS error man iterative four pilot symbol estimates of the present invention. Thus, the iterative RSSI estimation provides sufficient improvement to reduce pilot symbol overhead in each time slot without compromise to SIR estimation.

Figure 6B:
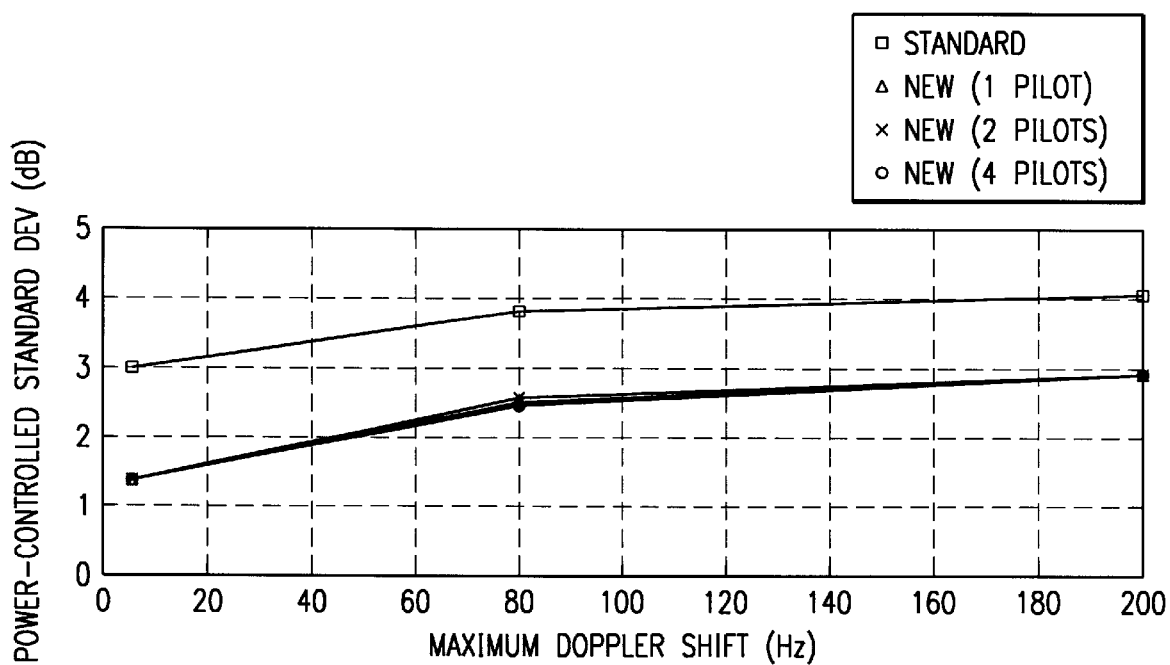
FIG. 6B is a simulation result of standard deviation of a closed-loop power control system of the present invention.

Turning now to FIG. 6B, he is a simulation result comparing a standard deviation of closed-loop power control for three Doppler rates. The upper curve shows a significantly greater standard deviation in transmit power for all Doppler rates than with iterative RSSI estimates of the present invention. In particular, the standard deviation for a 5 Hz Doppler rate is reduced by half from 3 dB to less than 1.5 dB. Furthermore, as in the previous simulation, the standard deviation is substantially the same for one, two or four pilot symbol in each time slot.

Although the invention has been described in detail with reference to its preferred embodiment, it is to be understood that this description is by way of example only and is not to be construed in a limiting sense. For example, the iterative RSSI estimation of the present invention may be extended to more than two iterations. Moreover, virtual pilot symbols may include a single data symbol, a rate information symbol or any other symbols that are corrected for phase and frequency. Furthermore, another embodiment of the present invention includes a user identification symbol (UDI) for each time slot. This UDI symbol indicates a presence or absence of data within a time slot. For example, during voice transmission time slots corresponding to a pause in speaking would have no data symbols. Such an indication by the UDI symbol instructs circuits of the present invention to rely on pilot symbols alone for Rayleigh fading parameter estimates and SIR estimates. Furthermore, all of the aforementioned circuits, such as estate and averaging circuits, may be formed on a single integrated circuit.

It is understood that the inventive concept of the present invention may be embodied in a mobile communication system as well as circuits within the mobile communication system. It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. A circuit comprising:
   an estimate circuit coupled to receive a plurality of predetermined signals including first and third predetermined signals from an external source, the estimate circuit producing a first estimate signal in response to at least the third predetermined signal; and
   an averaging circuit coupled to receive a first data signal and said first predetermined signal, the averaging circuit producing a first average signal from the first data signal and said first and not said third predetermined signals.

2. A circuit as in claim 1, wherein each predetermined signal of the plurality of predetermined signals comprises a group of pilot symbols, each group of pilot symbols corresponding to a respective time slot.

3. A circuit as in claim 2, further comprising a combiner circuit coupled to receive a first group of pilot symbols at a first time and coupled to receive the first group of pilot symbols at a second time, the combiner circuit arranged to produce an average of the first group received at the first time and the first group received at the second time.

4. A circuit as in claim 1, wherein the data signal comprises a plurality of data symbols.

5. A circuit as in claim 1, further comprising a comparison circuit coupled to receive the first estimate signal and a reference signal, the comparison circuit producing a control signal in response to the first estimate signal and the reference signal.

6. A circuit as in claim 1, wherein the estimate circuit is further coupled to receive the first average signal, the estimate circuit producing a second estimate signal in response to the first average signal.

7. A circuit as in claim 6, wherein the averaging circuit is coupled to receive the second estimate signal, a second predetermined signal, and a second data signal, the averaging circuit producing a second average signal of the second predetermined signal and the second data signal in response to the second estimate signal.

8. A circuit as in claim 7, wherein the plurality of predetermined signals are wideband code division multiple access signals received in a transmitted frame and wherein each predetermined signal corresponds to a respective time slot.

9. A circuit as in claim 8, wherein each predetermined signal comprises a plurality of pilot symbols.

10. A circuit as in claim 8, wherein the estimate circuit and the averaging circuit are formed on a single integrated circuit.

11. A circuit as in claim 6, wherein the first estimate signal and the second estimate signal are Rayleigh fading parameter estimate signals.

12. A circuit as in claim 1, further coupled to receive a user identification symbol, wherein the averaging circuit produces the first average signal from the first predetermined signal and not the first data signal in response to the user identification symbol.

13. A circuit comprising:
   a correction circuit coupled to receive a data signal and a first estimate signal, the correction circuit arranged to produce a corrected data signal in response to the first estimate signal;
   an estate circuit coupled to receive a plurality of predetermined signals and the corrected data signal, the estimate circuit producing a second estimate signal in response to at least one of the plurality of predetermined signals and the corrected data signal; and
   a comparison circuit coupled to receive the second estimate signal and a reference signal, the comparison circuit producing a control signal in response to the second estimate signal and the reference signal.

14. A circuit as in claim 13, wherein the second estate signal is a signal-to-interference ratio signal, the reference signal is a signal-to-interference reference signal and the control signal is a transmit power control symbol.

15. A circuit as in claim 13, wherein each of the first and second estimate signals are channel estimate signals and wherein the correction circuit is further coupled to receive the second estimate signal, the correction circuit arranged to produce a second corrected data signal in response to the second estimate signal.

16. A circuit as in claim 15, wherein the estimate circuit produces a signal-to-interference ratio signal in response to the second corrected data signal and wherein the comparison circuit produces a transmit power control symbol in response to the signal-to-interference ratio signal and the reference signal.

17. A circuit as in claim 13, wherein the data signal comprises a plurality of data symbols.

18. A circuit as in claim 13, wherein the corrected data signal comprises a plurality of demodulated QPSK data signals.

19. A circuit as in claim 18, wherein each predetermined signal of the plurality of predetermined signals comprises a group of pilot symbols, each group of pilot symbols corresponding to a respective time slot.

20. A method of processing signals in a communication circuit, comprising the steps of:
receiving a first plurality of predetermined signals including first and third predetermined signals from an external source;
producing a first estimate signal in response to at least the third predetermined signal;
receiving a first data signal;
correcting the first data signal in response to the first estimate signal; and
producing a first average of the first and not the Third predetermined signals and the corrected first data signal.

21. A method of processing signals as in claim 20, further comprising the steps of:
receiving a second plurality of predetermined signals from a plurality of external sources;
producing a second average of at least one of the second plurality of predetermined signals; and
producing a signal-to-interference ratio signal in response to the first average and the second average.

22. A method of processing signals as in claim 20, wherein each of the first and third predetermined signals comprises plural pilot symbols, and wherein each of the first and third predetermined signals corresponds to a respective time slot of a frame.

23. A method of processing signals as in claim 20, further comprising the steps of:
producing a second estimate signal from the first average;
receiving a second data signal;
correcting the data second signal in response to the second estimate signal; and
producing a second average of a second predetermined signal of the plurality of predetermined signals and the corrected second data signal.

24. A method of processing signals as in claim 20, wherein each group of the first plurality of groups is a group of pilot symbols in a respective time slot.

25. A method of processing signals as in claim 20, wherein the data signal comprises a plurality of data symbols.

26. A method of processing signals in a communication circuit, comprising the steps of:
receiving a first predetermined signal and a first data signal from an external source;
receiving a second predetermined signal from the external source;
producing a channel estimate in response to the second predetermined signal;
correcting the first data signal in response to the channel estimate;
coherently averaging the first predetermined signal and the corrected first data signal, thereby producing a received signal strength;
calculating an interference signal strength; and
producing a power control signal in response to the received signal strength and he interference signal strength.

27. A method as in claim 26, wherein each of the first and second predetermined signals comprises at least one pilot symbol.

28. A method as in claim 26, wherein the first data signal comprises a plurality of data symbols.

29. A method as in claim 26, wherein the first predetermined signal and the first data signal correspond to a single time slot.

* * * * *